US010931772B2

(12) United States Patent
Li et al.

(10) Patent No.: US 10,931,772 B2
(45) Date of Patent: Feb. 23, 2021

(54) METHOD AND APPARATUS FOR PUSHING INFORMATION

(71) Applicant: Baidu Online Network Technology (Beijing) Co., Ltd., Beijing (CN)

(72) Inventors: Lan Li, Beijing (CN); Lu Jin, Beijing (CN)

(73) Assignee: Baidu Online Network Technology (Beijing) Co., Ltd., Beijing (CN)

( * ) Notice: Subject to any disclaimer, the term of this patent is extended or adjusted under 35 U.S.C. 154(b) by 0 days.

(21) Appl. No.: 16/297,041

(22) Filed: Mar. 8, 2019

(65) Prior Publication Data
US 2020/0007638 A1    Jan. 2, 2020

(30) Foreign Application Priority Data

Jun. 29, 2018   (CN) .......................... 201810701253.X

(51) Int. Cl.
G06F 16/2457   (2019.01)
H04L 29/08     (2006.01)
G06K 9/00      (2006.01)

(52) U.S. Cl.
CPC ........ H04L 67/26 (2013.01); G06F 16/24575 (2019.01); G06K 9/00845 (2013.01); H04L 67/12 (2013.01)

(58) Field of Classification Search
CPC ... H04L 67/26; H04L 67/12; G06F 16/24575; G06K 9/00845
See application file for complete search history.

(56) References Cited

U.S. PATENT DOCUMENTS

| 2007/0280203 | A1* | 12/2007 | Shaffer .................. H04L 12/66 370/352 |
| 2014/0306834 | A1* | 10/2014 | Ricci .................... G06F 16/583 340/902 |
| 2014/0365574 | A1* | 12/2014 | Franks ................ H04L 12/1895 709/204 |
| 2016/0104486 | A1* | 4/2016  | Penilla ................. G10L 15/005 704/232 |
| 2016/0288708 | A1  | 10/2016 | Chang |

FOREIGN PATENT DOCUMENTS

| CN | 105303829 A  |   | 2/2016 |
| CN | 105700682 A  | * | 6/2016 |
| CN | 105700682 A  |   | 6/2016 |
| CN | 106911763 A  |   | 6/2017 |
| CN | 107845231 A  | * | 3/2018 |
| CN | 107845231 A  |   | 3/2018 |
| CN | 107963082 A  |   | 4/2018 |
| JP | 2007-086880 A |  | 4/2007 |
| JP | 2008-070965 A |  | 3/2008 |
| JP | 2017-157130 A |  | 9/2017 |
| WO | 2007043679 A1 |  | 4/2007 |

* cited by examiner

*Primary Examiner* — SM A Rahman
(74) *Attorney, Agent, or Firm* — Nixon Peabody LLP

(57) ABSTRACT

Embodiments of the present disclosure disclose a method and apparatus for pushing information. An embodiment of the method includes: acquiring travelling information of a target vehicle, the travelling information of the target vehicle including at least one of travelling state information or current voice information of the target vehicle; the travelling state information indicating a traveling state of the target vehicle; determining a current emotional state of a current driver based on the travelling information of the target vehicle; and pushing push information matching the current emotional state.

9 Claims, 6 Drawing Sheets

METHOD AND APPARATUS FOR PUSHING INFORMATION

CROSS-REFERENCE TO RELATED APPLICATIONS

This application claims priority to Chinese Application No. 201810701253.X, filed on Jun. 29, 2018 and entitled "Method and Apparatus for Pushing Information," the entire disclosure of which is hereby incorporated by reference.

TECHNICAL FIELD

The present disclosure relates to the field of computer technology, specifically to the field of Internet technology, and more specifically to a method and apparatus for pushing information.

BACKGROUND

With the development of Internet technology, more and more devices can be connected to the Internet. Automobiles may also be connected to the Internet to acquire information on the Internet.

Automobile information services, have gradually developed from information services such as route navigation for an automobile user to information services pushing diverse information such as entertainment information to the automobile user.

SUMMARY

Embodiments of the present disclosure provide a method and apparatus for pushing information.

In a first aspect, an embodiment of the present disclosure provides a method for pushing information, the method including: acquiring travelling information of a target vehicle, the travelling information of the target vehicle comprising at least one of travelling state information or current voice information of the target vehicle, the travelling state information indicating a traveling state of the target vehicle; determining a current emotional state of a current driver based on the travelling information of the target vehicle; and pushing push information matching the current emotional state.

In some embodiments, the travelling information of the target vehicle includes the current voice information. Before pushing the push information matching the current emotional state, the method further includes: determining a target group the driver belongs to based on the current voice information. The pushing the push information matching the current emotional state includes: pushing push information matching the target group.

In some embodiments, before pushing the push information matching the current emotional state, the method further includes: acquiring historical information service data provided to the current driver; extracting personal interest information of the current driver based on the historical information service data. The pushing the push information matching the current emotional state further includes: pushing push information matching the current emotional state and the personal interest information.

In some embodiments, the method further includes: determining, in response to determining an abnormal travelling parameter based on the travelling state information, an abnormal event corresponding to the abnormal travelling parameter. The pushing the push information matching the current emotional state further includes: pushing at least one piece of information related to handling the abnormal event.

In some embodiments, the method further includes: sending, in response to determining the abnormal travelling parameter based on the travelling state information, abnormal event information to a preset contact. The abnormal event information indicates an abnormal event corresponding to the abnormal travelling parameter.

In a second aspect, an embodiment of the present disclosure further provides an apparatus for pushing information, the apparatus including: an acquiring unit, configured to acquire travelling information of a target vehicle, the travelling information of the target vehicle including at least one of travelling state information or current voice information of the target vehicle, the travelling state information indicating a traveling state of the target vehicle; a determining unit, configured to determine a current emotional state of a current driver based on the travelling information of the target vehicle; and a pushing unit, configured to push push information matching the current emotional state.

In some embodiments, the travelling information of the target vehicle includes the current voice information. The apparatus further includes a target group determining unit. The target group determining unit is configured to determine a target group the driver belongs to based on the current voice information, before the pushing unit pushes the push information matching the current emotional state. The pushing unit is further configured to push push information matching the target group.

In some embodiments, the apparatus further includes a personal interest information acquiring unit. The personal interest information acquiring unit is configured to: acquire historical information service data provided to the current driver, before the pushing unit pushes the push information matching the current emotional state; and extract personal interest information of the current driver based on the historical information service data. The pushing unit is further configured to push push information matching the current emotional state and the personal interest information.

In some embodiments, the apparatus further includes an abnormal event determining unit. The abnormal event determining unit is configured to: determine, in response to determining an abnormal travelling parameter based on the travelling state information, an abnormal event corresponding to the abnormal travelling parameter. The pushing unit is further configured to push at least one piece of information related to handling the abnormal event.

In some embodiments, the pushing unit is further configured to: send, in response to determining the abnormal travelling parameter based on the travelling state information, abnormal event information to a preset contact; and wherein the abnormal event information indicates an abnormal event corresponding to the abnormal travelling parameter.

In a third aspect, an embodiment of the present disclosure further provides a server, the server including one or more processors; and a storage apparatus, storing one or more programs, the one or more programs, when executed by the one or more processors, cause the one or more processors to implement the method according to any one of implementations according to in first aspect.

In a fourth aspect, an embodiment of the present disclosure further provides a computer readable medium, storing a computer program thereon, the computer program, when executed by a processor, causes the processor to implement the method according to any implementations in the first aspect.

The method and apparatus for pushing information according to the embodiments of the present disclosure, first obtains travelling information of the target vehicle, then determines the current emotional state of the current driver based on the travelling information of the target vehicle, and finally pushes the push information matching the current emotional state. The pushed information is beneficial to improve the emotional state of the current driver, thus reducing the incidence of traffic accidents due to the bad emotion of the driver.

BRIEF DESCRIPTION OF THE DRAWINGS

After reading detailed descriptions of non-limiting embodiments with reference to the following accompanying drawings, other features, objectives and advantages of the present disclosure will become more apparent.

DETAILED DESCRIPTION OF EMBODIMENTS

The present disclosure will be further described below in detail in combination with the accompanying drawings and the embodiments. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that the embodiments in the present disclosure and the features in the embodiments may be combined with each other on a non-conflict basis. The present disclosure will be described below in detail with reference to the accompanying drawings and in combination with the embodiments.

Figure 1:
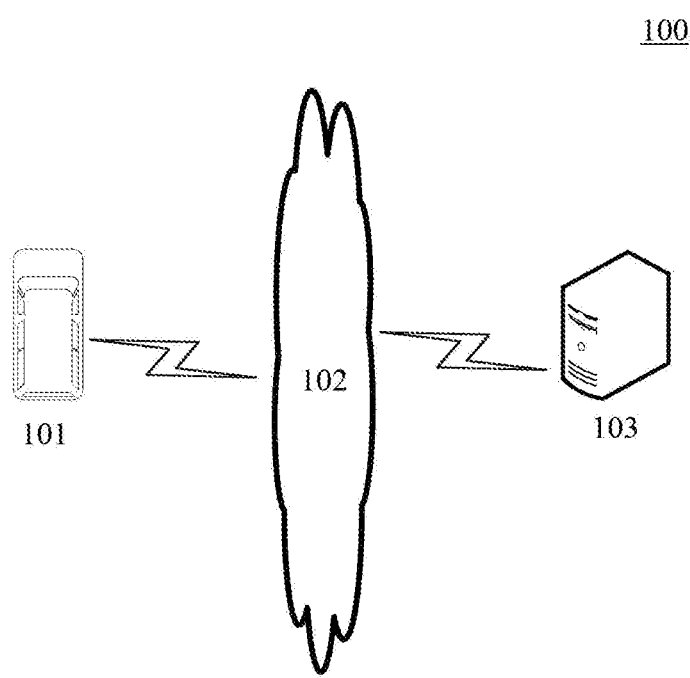
FIG. 1 is an architectural diagram of an exemplary system in which the present disclosure may be implemented.

FIG. 1 shows an exemplary system architecture 100 in which an embodiment of a method for pushing information of the present disclosure may be implemented.

As shown in FIG. 1, the system architecture 100 may include a motor vehicle 101, a network 102, and a server 103. The network 102 serves as a medium providing a communication link between the motor vehicle 101 and the server 103. The network 104 may include various types of connections, such as wired or wireless communication links, or optical fibers.

The motor vehicle 101 may be provided with various sensors to detect travelling state parameters of the motor vehicle. The motor vehicle may interact with the server via the network, for example, to transmit the travelling state parameters of the motor vehicle to the server, and receive push information returned by the server. A vehicle-mounted terminal device may be provided on the motor vehicle, and the push information is played or displayed by the vehicle-mounted terminal device to the driver.

The vehicle-mounted terminal device may be hardware or software. When the vehicle-mounted terminal device is hardware, the vehicle-mounted terminal device may be various electronic devices having a display screen and supporting playing of audio and video, including but not limited to an on-board computer, a smart phone, a tablet computer, a laptop portable computer, a desktop computer, or the like. When the vehicle-mounted terminal device is software, the vehicle-mounted terminal device may be installed in the above-listed electronic devices. The vehicle-mounted terminal device may be implemented as a plurality of software programs or software modules (e.g., software programs or software modules for providing distributed services), or as a single software program or software module, which is not specifically limited in the present disclosure.

The server 103 may provide various services, such as analyzing and processing travelling state information of the motor vehicle and/or current voice information of a driver transmitted by the motor vehicle 101, and transmitting a processing result (for example, push information matching current emotional state of the driver obtained by analyzing the travelling state information and/or the current voice information of the driver) to the motor vehicle 101, so as to cause the vehicle-mounted terminal device of the motor vehicle to play the processing result to the driver.

It should be noted that the method for pushing information according to the embodiments of the present disclosure may be performed by the server 103. Accordingly, the apparatus for pushing information may be provided in the server 103.

It should be noted that the server may be hardware or software. When the server is hardware, the server may be implemented as a distributed server cluster composed of a plurality of servers, or may be implemented as a single server. When the server is software, the server may be implemented as a plurality of software programs or software modules (such as software programs or software modules for providing distributed services), or may be implemented as a single software program or software module, which is not specifically limited in the present disclosure.

It should be understood that the numbers of motor vehicles, networks, and servers in FIG. 1 are merely illustrative. Any number of motor vehicles, networks, and servers may be provided based on actual requirements.

Figure 2:
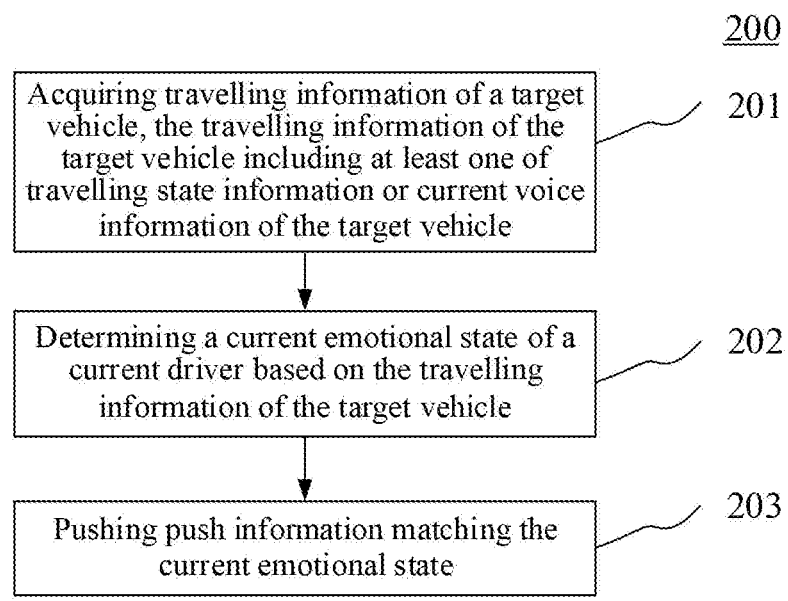
FIG. 2 is a flowchart of a method for pushing information according to an embodiment of the present disclosure.

Further, referring to FIG. 2, a flow 200 of an embodiment of a method for pushing information according to the present disclosure is shown. The method for pushing information includes the following steps.

Step 201: acquiring travelling information of a target vehicle, the travelling information of the target vehicle including at least one of travelling state information or current voice information of the target vehicle.

In the present embodiment, the executing body (for example, the server shown in FIG. 1) of the method for pushing information may acquire the travelling information of the target vehicle from the target vehicle in real time through a wired or wireless connection.

In the present embodiment, the travelling information of the target vehicle may include at least one of travelling state information or current voice information of the target vehicle.

In other words, the executing body may acquire the travelling state information of the target vehicle from the target vehicle. Alternatively, the executing body may acquire the current voice information in the target vehicle from the target vehicle. Alternatively, the executing body may acquire the travelling state information of the target vehicle and the current voice information in the target vehicle from the target vehicle. Here, the current voice information in the target vehicle may be the current voice information of the driver of the target vehicle.

Here, the travelling state information may be information for indicating a traveling state of the target vehicle. For example, the travelling state information may include but not limited to at least one of: a current vehicle attitude, a current vehicle condition, a current road condition, driving time, a current vehicle position, a vehicle driving track, or the like.

In the present embodiment, an audio information input apparatus such as a microphone, a vehicle-mounted terminal device capable of inputting audio information may be provided in the target vehicle. The executing body may acquire the voice information inputted by the driver through the audio information input apparatus in real time from the target vehicle.

Step 202: determining a current emotional state of a current driver based on the travelling information of the target vehicle.

In the present embodiment, based on the travelling information of the target vehicle obtained in step 201, the executing body (for example, the server shown in FIG. 1) may analyze the travelling information of the target vehicle by using various analysis means, thereby obtaining the current emotional state of the current driver.

Emotional state refers to the emotions that a person shows in a certain time period under the influence of a certain event or situation. Usually, human mental activities are emotionally colored and expressed in different moods, passions, and stress states. Emotions may usually include positive emotions and negative emotions. The positive emotions include: happy, relaxed, calm, dispassionate. The negative emotions include: angry, fatigued, nervous, flurried.

During the travelling, as the subjective and objective conditions changed, the emotional state of the driver may also change accordingly.

The emotional state of the driver is related to the external environment and personal condition.

Driving pressure caused by adverse external environment for driving may easily lead to negative emotions of the driver. The external environment may include, for example, but is not limited to at least one of traffic congestion, frequent emergencies, complicated road conditions, or traffic flow of pedestrians.

The personal condition may include, for example, but is not limited to at least one of personal quality, health condition of the driver, psychological endurance of the driver, or driving skills of the driver.

If the travelling information is the travelling state information, the executing body may first analyze travelling parameters, such as continuous driving duration at this time, vehicle speed, or acceleration, from the travelling state information of the target vehicle. Travelling characteristics may be determined based on the above travelling parameters. For example, whether the driver is fatigued, whether the speed increase exceeds a preset threshold in a short time period, or whether the speed decrease exceeds a preset threshold in a short time period may be determined based on the continuous driving duration.

The emotional state of the driver may be reflected in his operation of the vehicle being driven. The driver's operation of the vehicle being driven may be characterized by the travelling characteristics of the vehicle.

For example, a travelling characteristic such as a speed increase exceeding a preset threshold in a short time period, a speed decrease exceeding a preset threshold in a short time period, a sharp turn, or the like may be interpreted as that the emotional state of the driver is a negative emotion. When the driving speed of the target vehicle is relatively uniform, the driving characteristic of the driver may be interpreted as that the emotional state of the driver is a positive emotion.

In some alternative implementations of the present embodiment, the travelling parameters analyzed from the travelling state information of the target vehicle may be inputted to a pre-trained emotional state recognition model, thereby obtaining the current emotional state of the current driver. The current emotional state may include, but is not limited to: happy, calm, fatigued, angry, or the like.

Before identifying the emotional state using the emotional state recognition model, the initial emotional state recognition model may be trained by using travelling parameters massively added with emotional state annotations as the training data to obtain the trained emotional state recognition model.

The emotional state recognition model may be, for example, a decision tree model, a selection tree model, or a neural network model.

Statistical studies have shown that female drivers are more likely to experience the negative emotions during driving than male drivers.

Therefore, in some alternative implementations, gender of the driver may also be inputted as a parameter to the pre-trained emotional state recognition model, thereby obtaining the current emotional state of the current driver. It can be understood that during training the initial emotional state recognition model, it is necessary to add annotations such as gender, emotional state to the training data.

If the travelling information is the current voice information, the executing body may first extract current acoustic characteristics of the driver from the current voice information of the current driver: fundamental frequency (fundamental frequency average, range, maximum value, minimum value), energy (mean, range, variance), speech rate, and fluency in language expression.

Generally, when people are in a happy emotional state, the short-term energy in the acoustic characteristics is enhanced, and the speech rate becomes faster. When people are in an angry emotional state, the fundamental frequency in acoustic characteristics increases the most.

Then, the executing body may input the acoustic characteristics of the current voice into a pre-trained voice-emotion recognition model to determine the current emotional state of the current driver. The emotional state here may include, but is not limited to: happy, calm, fatigued, angry.

The voice-emotion recognition model here may be, for example, various types of neural network models.

Before using the voice-emotion recognition model, the initial voice-emotion recognition model needs to be trained by using the acoustic characteristics massively added with emotional state annotations, so as to obtain the trained voice-emotion recognition model. The emotional state here may include, but is not limited to: happy, calm, fatigued, angry.

If the travelling information is the travelling state information and the current voice information, the executing body may first determine the corresponding current emotional state of the current driver based on the travelling state information and the current voice information, respectively. The current emotional state of the driver is then determined according to the current emotional state of the current driver determined based on the travelling state information, and the current emotional state of the current driver determined based on the current voice information. For example, if at least one of the current emotional state of the current driver determined by the travelling state information and the current emotional state of the current driver determined by the current voice information is a negative emotion, it may be determined that the current emotional state of the current driver is a negative emotion. Such negative emotion may include, but is not limited to: angry, fatigued, nervous, or flurried.

Step 203: pushing push information matching the current emotional state.

After obtaining the current emotional state of the current driver in step 202, the executing body may first obtain the push information that matches the current emotional state, and then push the push information that matches the current emotional state to the target vehicle. The push information is played to the driver by the vehicle-mounted terminal device in the target vehicle.

The massive data may be statisticised in advance to statisticise information that people like to listen to when they are in a positive emotional state, such as happy, relaxed, here the information may be, for example, entertainment information, news information; and statisticise information capable of alleviating a negative emotion when people are in a negative emotional state, such as angry, fatigued. Here the information capable of alleviating a negative emotion may be, for example, various entertainment information, family message.

The massively statisticised push information matching the positive emotional states and the push information matching the various negative emotional states may be stored in advance in a preset database. Here, the preset database stores various emotional states, and push information that matches each of the emotional states. The emotional states and push information matching the emotional states may be associated and stored in the preset database. The emotional states here may include, for example, but is not limited to: happy, relaxed, angry, and flurried.

The preset database may be set locally on the executing body or set in a remote server. If the preset database is set in the remote server, the executing body may access the preset database set in the remote server via the network.

Figure 3:
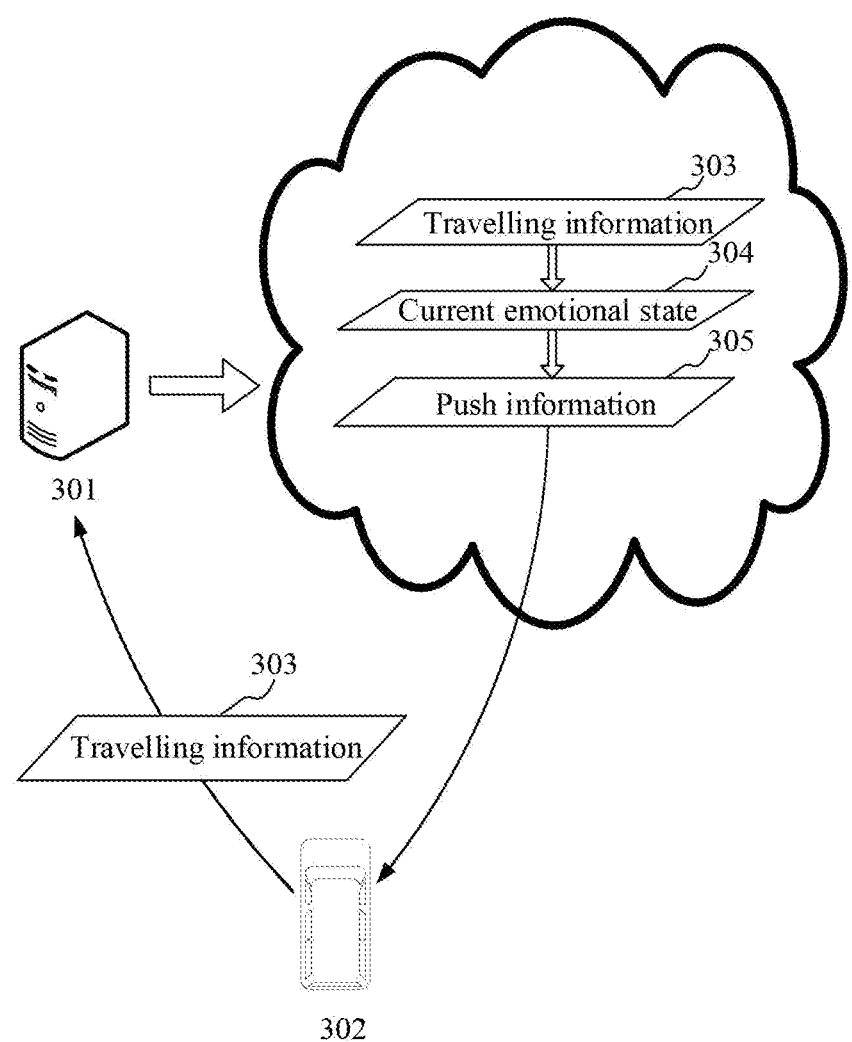
FIG. 3 is a schematic diagram of an application scenario of the method for pushing information according to the present disclosure.

Referring to FIG. 3, which is a schematic diagram 300 of an application scenario of the method for pushing information according to the present embodiment. In the application scenario of FIG. 3, the server 301 first acquires travelling information of the target vehicle, the travelling information of the target vehicle including at least one of travelling state information 303 or current voice information 303 of the target vehicle 302, where the travelling state information is used for indicating a travelling state of the target vehicle. Then the server 301 determines the current emotional state 304 of the current driver based on the travelling information 303 of the target vehicle. Finally, the server 301 pushes the push information 305 matching the current emotional state to the target vehicle 302.

The method according to the embodiments of the present disclosure first obtains travelling information of the target vehicle, the travelling information of the target vehicle including at least one of travelling state information or current voice information of the target vehicle, then determines the current emotional state of the current driver based on the travelling information of the target vehicle, and finally pushes the push information matching the current emotional state. The pushed information is beneficial to improve the emotional state of the current driver, so that the pushed information is pertinent. In addition, if the current emotional state is a bad emotional state, the pushed information is helpful to alleviate the bad emotion of the driver, thereby reducing the incidence of traffic accidents due to the bad emotion of the driver.

In some alternative implementations of the present embodiment, the method for pushing information may further include: determining, in response to determining an abnormal travelling parameter based on the travelling state information, an abnormal event corresponding to the abnormal travelling parameter. And pushing push information matching the current emotional state further includes: pushing at least one piece of information related to handling the abnormal event.

In these alternative implementations, the executing body may determine whether the travelling parameter obtained based on the travelling state information in step 202 is abnormal. If it is determined that there is an abnormal travelling parameter, the executing body may further determine an abnormal event corresponding to the abnormal travelling parameter, and then push at least one piece of information related to handling the abnormal event. For example, in the event of a rear-end collision during the travelling, the executing body may determine an abnormal travelling parameter based on the travelling state information; and then determine that a rear-end collision occurs based on the abnormal travelling parameter. At this time, the executing body may push push information on how to handle the rear-end collision to the driver. In this way, the push information pushed to the driver includes information for handling the abnormal event, which may help the driver to find a solution in a flurried state after the event occurs, and help to improve the speed of solving an abnormal event.

In some alternative implementations of the present embodiment, the method for pushing information may further include: sending, in response to determining the abnormal travelling parameter based on the travelling state information, abnormal event information to a preset contact. The abnormal event information is used for indicating an abnormal event corresponding to the abnormal travelling parameter.

In these alternative implementations, the executing body may determine whether the travelling parameter obtained based on the travelling state information in step 202 is abnormal. If it is determined that there is an abnormal travelling parameter, the executing body may further determine an abnormal event corresponding to the abnormal travelling parameter. Then the abnormal event information is sent to the preset contact to make the contact aware of the abnormal event suffered by the current driver.

Here, the pre-set contact may be, for example, a person who has a preset relationship with the current driver, such as a relative of the current driver, or a friend of the current driver. In addition, the preset contact may also be a person related to handling an abnormal event, such as a traffic policeman, or a claimant of an insurance company.

Figure 4:
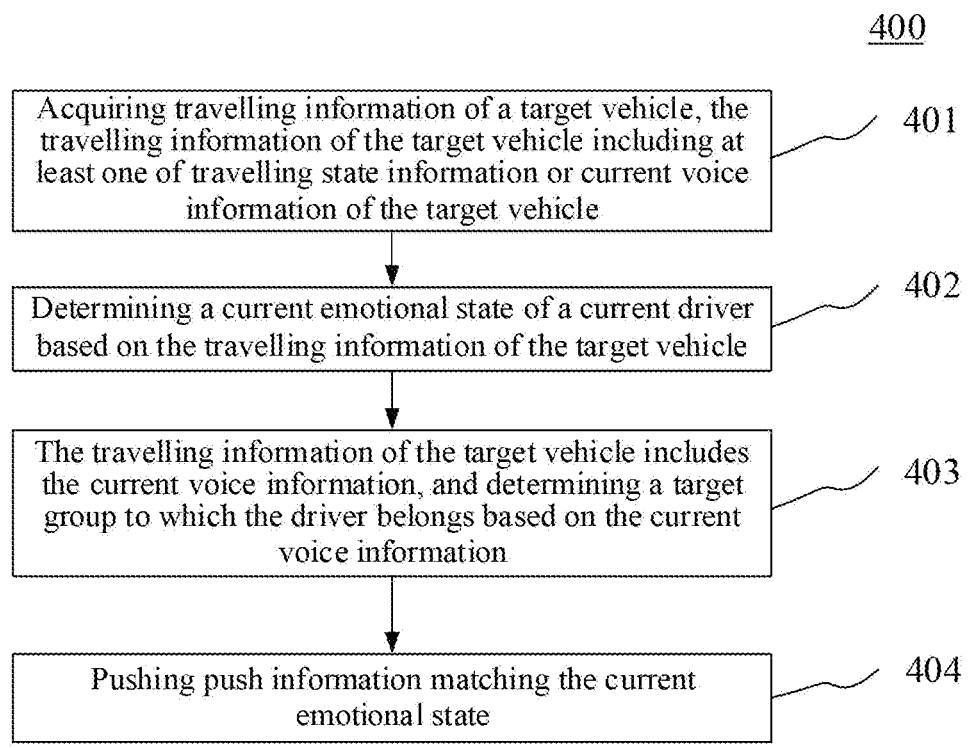
FIG. 4 is a flowchart of the method for pushing information according to another embodiment of the present disclosure.

With further reference to FIG. 4, a flow 400 of another embodiment of the method for pushing information is shown. The flow 400 of the method for pushing information includes the following steps.

Step 401: acquiring travelling information of a target vehicle, the travelling information of the target vehicle including at least one of travelling state information or current voice information of the target vehicle.

In the present embodiment, step 401 is the same as step 201 as shown in FIG. 2, and the description will not be repeated here.

Step 402: determining a current emotional state of a current driver based on the travelling information of the target vehicle.

Step 403: the travelling information of the target vehicle includes the current voice information, and determining a target group to which the driver belongs based on the current voice information.

In the present embodiment, the executing body may determine the target group to which the current driver belongs based on the voice information.

The target group may be, for example, female drivers or male drivers. The executing body may determine from the voice whether the current driver belongs to female drivers or male drivers.

The target group may also be novice drivers or skilled drivers. The executing body may determine whether the driver is a novice driver or a skilled driver by inquiring voice information. Specifically, the driver may be inquired by the vehicle-mounted terminal device by transmitting the inquiry information to the vehicle-mounted terminal device. Then the vehicle-mounted terminal device uploads answer information of the driver to the executing body. In addition, the executing body may further determine the identity information of the driver based on the voice information, and determine whether the driver is a novice driver or a skilled driver based on a historical driving record that matches the identity information of the driver.

Step 404: pushing push information matching the current emotional state.

In the present embodiment, the executing body may push the push information that matches the current emotional state of the driver.

In some alternative implementations of the present embodiment, for any target group, the executing body may statisticise in advance the push information suitable for the target group by using massive data.

In these alternative implementations, after the target group to which the current driver of the target vehicle belongs is determined in step 403, the executing body may determine the push information that matches the current emotional state from the push information suitable for the target group, and then push the push information that matches the target group and the current emotional state.

In some application scenarios, if the current driver of the target vehicle is a female driver, when it is determined that the current driver is in an emotional state such as angry or fatigued, the executing body may push the push information, statisticised by massive users and suitable for alleviating the emotion such as angry or fatigued of the female driver, to the current driver.

In the present implementation, the current driver is further categorized into a target group, and information is pushed to the current driver based on the target group to which the current driver belongs, such that the pushed information is fitter for the current driver of the target vehicle, which may further alleviate the emotional state of the current driver, thereby reducing the incidence of traffic accidents caused by a bad emotional state of driver more effectively.

As can be seen from FIG. 4, as compared with the embodiment corresponding to FIG. 2, the flow 400 of the method for pushing information in the present embodiment highlights the steps of determining the target group to which the current driver belongs, and pushing the push information matching the current emotional state may include pushing the push information matching the target group and the current emotional state. Therefore, the solution described in the present embodiment makes the pushed information fitter for the current driver of the target vehicle, which may further alleviate the emotional state of the current driver, thereby reducing the incidence of traffic accidents caused by a bad emotional state of driver more effectively.

Figure 5:
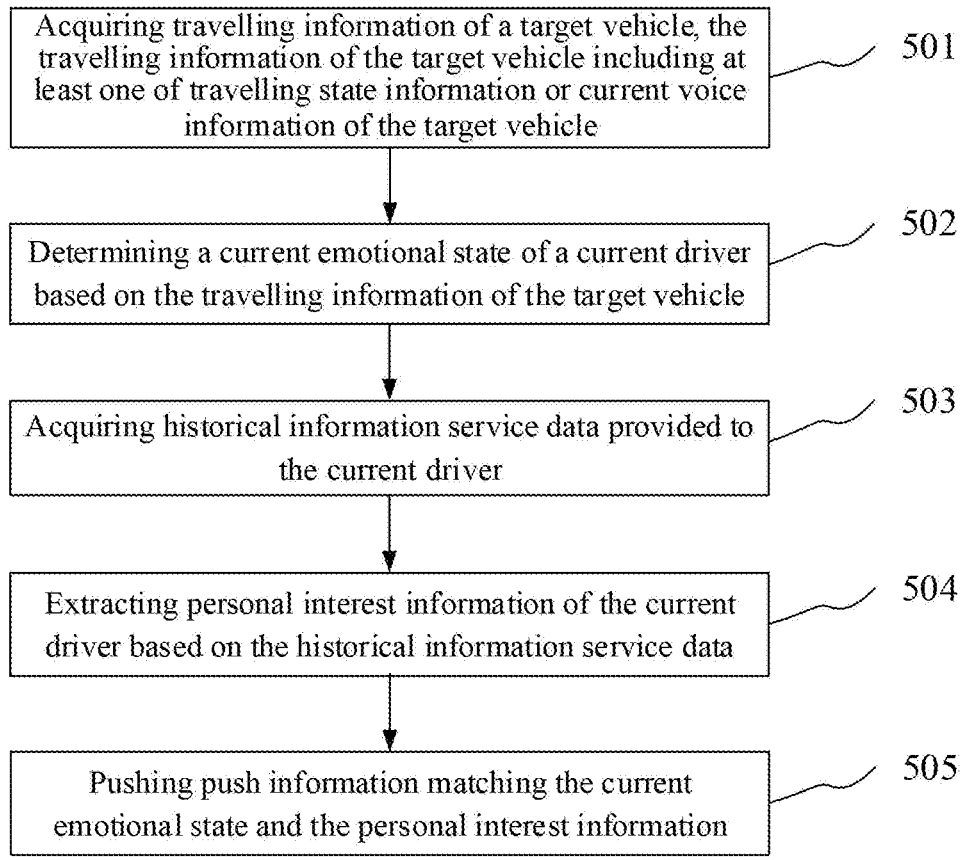
FIG. 5 is a flowchart of the method for pushing information according to yet another embodiment of the present disclosure.

With further reference to FIG. 5, a flow 500 of another embodiment of the method for pushing information is shown. The flow 500 of the method for pushing information includes the following steps.

Step 501: acquiring travelling information of a target vehicle, the travelling information of the target vehicle including at least one of travelling state information or current voice information of the target vehicle.

In the present embodiment, step 501 is the same as step 201 as shown in FIG. 2, and the description will not be repeated here.

Step 502: determining a current emotional state of a current driver based on the travelling information of the target vehicle.

In the present embodiment, step 502 is the same as step 202 shown in FIG. 2, and the description will not be repeated here.

Step 503: acquiring historical information service data provided to the current driver.

In the present embodiment, the executing body may acquire historical information service data provided to the current driver by various means.

In the present embodiment, the travelling information of the target vehicle may include current voice information. The current voice information here may be the voice information of the current driver. The executing body may determine identity information of the driver through the voice information of the driver.

In addition, the executing body may further acquire a facial image of the current driver, and determine the identity information of the current driver from the facial image.

After obtaining the identity information of the current driver, the executing body may match the identity information of the current driver with a preset database. When the matching is successful, the historical information service data corresponding to the identity information may be searched in the preset database. The preset database stores the identity information of a plurality of drivers and the historical information service data corresponding to each piece of identity information. Here, the historical information service data may include various information historically provided to the driver. The identity information of the driver here may be identifier information for distinguishing different drivers.

The preset database may be set in the executing body or in a remote server. When the preset database is set in the remote server, the executing body may access the preset database via the network.

Step 504: extracting personal interest information of the current driver based on the historical information service data.

In the present embodiment, after the historical information service data provided to the current driver is obtained in step 503, the executing body may extract the personal interest information of the current driver from the historical information service data provided to the current driver. The personal interest information may include, but is not limited to: at least one of the following: a style of favorite music, a favorite variety entertainment program, a favorite song.

Step 505: pushing push information matching the current emotional state and the personal interest information.

In the present embodiment, the executing body may further select push information that matches the personal interest information of the current driver from the push information matching the current emotional state of the driver. Then push information that matches both the current emotional state of the current driver and the personal interest information of the current driver is pushed to the driver.

In the present embodiment, the information that the executing body pushes to the current driver considers both the current emotional state of the current driver and the personal interest of the current driver, which improves the pertinence of the information pushed to the current driver, and further helps to alleviate a bad emotional state of the current driver.

As can be seen from FIG. 5, as compared with the embodiment corresponding to FIG. 2, the flow 500 of the method for pushing information in the present embodiment highlights the steps of acquiring the personal interest information of the current driver, and pushing information to the current driver based on the current emotional state and personal interest information of the current driver. Thus, the solution described in the present embodiment improves the pertinence of the information pushed to the current driver, and further helps to alleviate a bad emotional state of the current driver.

Figure 6:
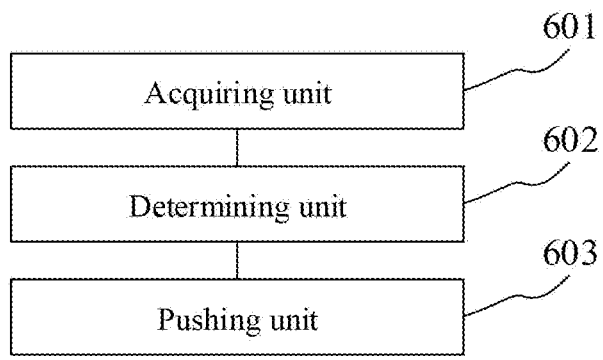
FIG. 6 is a schematic structural diagram of an apparatus for pushing information according to an embodiment of the present disclosure.

With further reference to FIG. 6, as an implementation of the method shown in the above figures, the present disclosure provides an embodiment of an apparatus for pushing information. The embodiment of the apparatus corresponds to the embodiment of the method shown in FIG. 2, and the apparatus may be applied to various electronic devices.

As shown in FIG. 6, the apparatus 600 for pushing information according to the present embodiment includes: an acquiring unit 601, a determining unit 602 and a pushing unit 603. The acquiring unit 601 is configured to acquire travelling information of a target vehicle, the travelling information of the target vehicle comprising at least one of travelling state information or current voice information of the target vehicle. The travelling state information indicates a traveling state of the target vehicle. The determining unit 602 is configured to determine a current emotional state of a current driver based on the travelling information of the target vehicle. The pushing unit 603 is configured to push push information matching the current emotional state.

In the present embodiment, the specific processing of the obtaining unit 601, the determining unit 602, and the pushing unit 603 of the apparatus 600 for pushing information and the technical effects thereof may be referred to the related description in step 201, step 202, and step 203 in the corresponding embodiment of FIG. 2, respectively. The description will not be repeated here.

In some alternative implementations of the present embodiment, the travelling information of the target vehicle includes the current voice information. The apparatus 600 for pushing information further includes a target group determining unit (not illustrated in the figure), and the target group determining unit is configured to determine a target group the driver belongs to based on the current voice information. The pushing unit 603 is further configured to push push information matching the target group.

In some alternative implementations of the present embodiment, the apparatus 600 for pushing information further includes a personal interest information acquiring unit (not illustrated in the figure). The personal interest information acquiring unit is configured to: acquire historical information service data provided to the current driver, before the pushing unit pushes the push information matching the current emotional state; and extract personal interest information of the current driver based on the historical information service data. The pushing unit 603 is further configured to push push information matching the current emotional state and the personal interest information.

In some alternative implementations of the present embodiment, the apparatus 600 for pushing information further includes an abnormal event determining unit (not illustrated in the figure). The abnormal event determining unit is configured to: determine, in response to determining an abnormal travelling parameter based on the travelling state information, an abnormal event corresponding to the abnormal travelling parameter. The pushing unit 603 is further configured to push at least one piece of information related to handling the abnormal event.

In some alternative implementations of the present embodiment, the pushing unit 600 is further configured to: send, in response to determining the abnormal travelling parameter based on the travelling state information, abnormal event information to a preset contact. The abnormal event information indicates an abnormal event corresponding to the abnormal travelling parameter.

Figure 7:
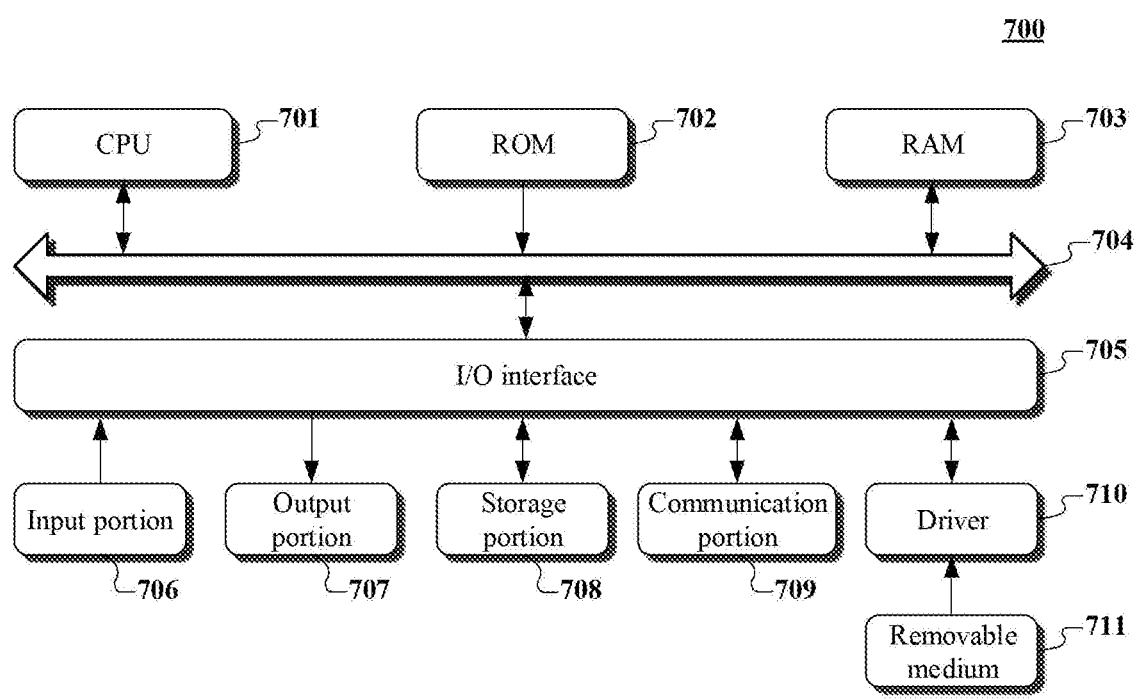
FIG. 7 is a schematic structural diagram of a computer system adapted to implement a server of embodiments of the present disclosure.

Referring to FIG. 7, a schematic structural diagram of a computer system 700 adapted to implement a server of the embodiments of the present disclosure is shown. The server shown in FIG. 7 is merely an example, and should not limit the function and scope of use of the embodiments of the present disclosure.

As shown in FIG. 7, the computer system 700 includes a central processing unit (CPU) 701, which may execute various appropriate actions and processes in accordance with a program stored in a read-only memory (ROM) 702 or a program loaded into a random access memory (RAM) 703 from a storage portion 708. The RAM 703 also stores various programs and data required by operations of the system 700. The CPU 701, the ROM 702 and the RAM 703 are connected to each other through a bus 704. An input/output (I/O) interface 705 is also connected to the bus 704.

The following components are connected to the I/O interface 705: a input portion 706 including a keyboard, a mouse, or the like; an output portion 707 including a cathode ray tube (CRT), a liquid crystal display device (LCD), a speaker, or the like; a storage portion 708 including a hard disk or the like; and a communication portion 709 including a network interface card, such as a LAN card and a modem. The communication portion 709 performs communication processes via a network, such as the Internet. A driver 710 is also connected to the I/O interface 705 as required. A removable medium 711, such as a magnetic disk, an optical disk, a magneto-optical disk, and a semiconductor memory, may be installed on the driver 710, so that a computer program read therefrom is installed on the storage portion 706 as needed.

In particular, according to embodiments of the present disclosure, the process described above with reference to the flow chart may be implemented in a computer software program. For example, an embodiment of the present disclosure includes a computer program product, which comprises a computer program that is tangibly embedded in a machine-readable medium. The computer program includes program codes for executing the method as illustrated in the flow chart. In such an embodiment, the computer program may be downloaded and installed from a network via the communication portion 709, and/or may be installed from the removable medium 711. The computer program, when executed by the CPU 701, implements the functions as defined by the methods of the present disclosure. It should be noted that the computer readable medium in the present disclosure may be computer readable signal medium or computer readable storage medium or any combination of the above two. An example of the computer readable storage medium may include, but is not limited to: electric, magnetic, optical, electromagnetic, infrared, or semiconductor systems, apparatus, elements, or a combination of any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fibre, a portable compact disk read only memory (CD-ROM), an optical memory, a magnet memory or any suitable combination of the above. In the present disclosure, the computer readable storage medium may be any tangible medium containing or storing programs which may be used by a command execution system, apparatus or element or incorporated thereto. In the present disclosure, the computer readable signal medium may include data signal in the base band or propagating as parts of a carrier, in which computer readable program codes are carried. The propagating data signal may take various forms, including but not limited to: an electromagnetic signal, an optical signal or any suitable combination of the above. The signal medium that can be read by computer may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF medium etc., or any suitable combination of the above.

A computer program code for executing operations in the present disclosure may be compiled using one or more programming languages or combinations thereof. The programming languages include object-oriented programming languages, such as Java, Smalltalk or C++, and also include conventional procedural programming languages, such as "C" language or similar programming languages. The program code may be completely executed on a user's computer, partially executed on a user's computer, executed as a separate software package, partially executed on a user's computer and partially executed on a remote computer, or completely executed on a remote computer or server. In the circumstance involving a remote computer, the remote computer may be connected to a user's computer through any network, including local area network (LAN) or wide area network (WAN), or may be connected to an external computer (for example, connected through Internet using an Internet service provider).

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion comprising one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system executing specified functions or operations, or by a combination of a dedicated hardware and computer instructions.

The units involved in the embodiments of the present disclosure may be implemented by means of software or hardware. The described units may also be provided in a processor, for example, described as: a processor, including an acquiring unit, a determining unit, and a pushing unit. Here, the names of these units do not in some cases constitute a limitation to such units themselves. For example, the acquiring unit may also be described as "a unit configured to acquire travelling state information of a target vehicle."

In another aspect, the present disclosure further provides a computer-readable medium. The computer-readable storage medium may be included in the apparatus in the above described embodiments, or a stand-alone computer-readable medium not assembled into the apparatus. The computer-readable medium stores one or more programs. The one or more programs, when executed by the apparatus, cause the apparatus to: acquire travelling information of a target vehicle, the travelling information of the target vehicle including at least one of travelling state information or current voice information of the target vehicle, the travelling state information indicating a traveling state of the target vehicle; determine a current emotional state of a current driver based on the travelling information of the target vehicle; and push push information matching the current emotional state.

The above description only provides an explanation of the preferred embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the disclosure. Technical schemes formed by the above-described features being interchanged with, but not limited to, technical features with similar functions disclosed in the present disclosure are examples.

What is claimed is:
1. A method for pushing information, the method comprising:
   acquiring travelling information of a target vehicle, the travelling information of the target vehicle comprising current voice information;

determining a current emotional state of a current driver based on the travelling information of the target vehicle;

determining a target group the driver belongs to, based on the current voice information, the target group comprising a novice driver and a skilled driver;

acquiring a facial image of the current driver, determining identity information of the current driver from the facial image, acquiring historical information service data provided to the current driver based on the determined identity information of the current driver, extracting personal interest information of the current driver based on the historical information service data; and pushing push information matching the current emotional state, the target group and the personal interest information.

2. The method according to claim 1, wherein the travelling information of the target vehicle further comprises travelling state information of the target vehicle, the travelling state information indicating a traveling state of the target vehicle, and the method further comprises:

determining, in response to determining an abnormal travelling parameter based on the travelling state information, an abnormal event corresponding to the abnormal travelling parameter; and the pushing the push information matching the current emotional state further comprises:

pushing at least one piece of information related to handling the abnormal event.

3. The method according to claim 2, the method further comprising:

sending, in response to determining the abnormal travelling parameter based on the travelling state information, abnormal event information to a preset contact; wherein the abnormal event information indicates an abnormal event corresponding to the abnormal travelling parameter.

4. An apparatus for pushing information, the apparatus comprising:

at least one processor; and a memory storing instructions, the instructions when executed by the at least one processor, cause the at least one processor to perform operations, the operations comprising:

acquiring travelling information of a target vehicle, the travelling information of the target vehicle comprising current voice information;

determining a current emotional state of a current driver based on the travelling information of the target vehicle;

determining a target group the driver belongs to, based on the current voice information, the target group comprising a novice driver and a skilled driver;

acquiring a facial image of the current driver, determining identity information of the current driver from the facial image, acquiring historical information service data provided to the current driver based on the determined identity information of the current driver, extracting personal interest information of the current driver based on the historical information service data; and pushing push information matching the current emotional state, the target group and the personal interest information.

5. The apparatus according to claim 4, wherein the travelling information of the target vehicle further comprises travelling state information of the target vehicle, the travelling state information indicating a traveling state of the target vehicle, and the operations further comprise:

determining, in response to determining an abnormal travelling parameter based on the travelling state information, an abnormal event corresponding to the abnormal travelling parameter; and the pushing the push information matching the current emotional state further comprises:

pushing at least one piece of information related to handling the abnormal event.

6. The apparatus according to claim 5, wherein the operations further comprise:

sending, in response to determining the abnormal travelling parameter based on the travelling state information, abnormal event information to a preset contact; wherein the abnormal event information indicates an abnormal event corresponding to the abnormal travelling parameter.

7. A non-transitory computer readable medium, storing a computer program thereon, the computer program, when executed by a processor, causes the processor to perform operations, the operations comprising:

acquiring travelling information of a target vehicle, the travelling information of the target vehicle comprising current voice information;

determining a current emotional state of a current driver based on the travelling information of the target vehicle;

determining a target group the driver belongs to, based on the current voice information, the target group comprising a novice driver and a skilled driver;

acquiring a facial image of the current driver, determining identity information of the current driver from the facial image, acquiring historical information service data provided to the current driver based on the determined identity information of the current driver, extracting personal interest information of the current driver based on the historical information service data; and pushing push information matching the current emotional state, the target group and the personal interest information.

8. The non-transitory computer readable medium according to claim 7, wherein the travelling information of the target vehicle further comprises travelling state information of the target vehicle, the travelling state information indicating a traveling state of the target vehicle, and the operations further comprise:

determining, in response to determining an abnormal travelling parameter based on the travelling state information, an abnormal event corresponding to the abnormal travelling parameter; and the pushing the push information matching the current emotional state further comprises:

pushing at least one piece of information related to handling the abnormal event.

9. The non-transitory computer readable medium according to claim 8, wherein the operations further comprise:

sending, in response to determining the abnormal travelling parameter based on the travelling state information, abnormal event information to a preset contact; wherein the abnormal event information indicates an abnormal event corresponding to the abnormal travelling parameter.

* * * * *